US008231955B2

(12) United States Patent
Rolf et al.

(10) Patent No.: US 8,231,955 B2
(45) Date of Patent: Jul. 31, 2012

(54) MATERIAL FOR ADHESIVE-FREE CLINGING TO SMOOTH SURFACES

(76) Inventors: David E. Rolf, Melrose Park, IL (US);
William E. Rolf, Glenview, IL (US)

( * ) Notice: Subject to any disclaimer, the term of this patent is extended or adjusted under 35 U.S.C. 154(b) by 304 days.

(21) Appl. No.: 12/749,676

(22) Filed: Mar. 30, 2010

(65) Prior Publication Data

US 2011/0244161 A1 Oct. 6, 2011

(51) Int. Cl.
*B32B 3/00* (2006.01)
*B32B 3/10* (2006.01)
*B32B 3/16* (2006.01)

(52) U.S. Cl. ...... 428/40.1; 428/41.8; 428/141; 428/156; 428/158; 428/304.4

(58) Field of Classification Search ................. 428/40.1, 428/41.4, 41.8, 98, 99, 116, 131, 138, 141, 428/156, 157, 158, 304.4, 317.1, 317.3, 317.5
See application file for complete search history.

*Primary Examiner* — Patricia Nordmeyer
(74) *Attorney, Agent, or Firm* — Barnes & Thornburg LLP

(57) ABSTRACT

A material for clinging to smooth, impervious surfaces and supporting other objects thereon. The material includes a body of foamed polyvinyl chloride, having a foam cellular structure of about 80% closed cell foam and up to about 20% open cell foam. A flexible skin is formed on one side, the skin being unfoamed polyvinyl chloride, and having surface imperfections comprising small cavities. An adhesive layer may be formed on the opposite side to secure the body to objects mounted by the material on a smooth surface. The material bears a load in addition to the weight of the material itself when the flexible skin adheres to a vertical surface, such as a mirror or stainless steel refrigerator door.

15 Claims, 4 Drawing Sheets

MATERIAL FOR ADHESIVE-FREE CLINGING TO SMOOTH SURFACES

BACKGROUND OF THE INVENTION

This invention relates to mounting materials, and in particular to a material for adhesive-free clinging to smooth, impervious surfaces.

For years, foam strips have been used to mount various objects on walls and the like, where the foam is formed in flat sheets, is provided with adhesive on one or both sides, and a release is applied over the adhesive until use of the foam is desired. At that time, the release is removed, and the foam, with its adhesive surface exposed, is then adhesively applied to another surface. U.S. Pat. No. 4,828,881 is but one example of a large body of prior art of this nature.

Means of applying objects to a wall and the like without use of adhesives have also been developed. For example, U.S. Pat. No. 5,638,249 discloses a support system using electrostatic force to maintain objects, such as posters, on a wall. While an improvement over adhesives systems because the poster can be readily removed, the system is still quite expensive.

SUMMARY OF THE INVENTION

The invention is directed to a material for clinging to smooth, impervious surfaces. It is composed of a body of foamed polyvinyl chloride, with the body having a foam cellular structure of about 80% closed cell foam and up to about 20% open cell foam. A flexible skin is formed on at least one side of the body, with the skin being of unfoamed polyvinyl chloride, and the skin having surface imperfections comprising small cavities. The material bears a load in addition to the weight of the material itself when applied to a surface.

In accordance with the preferred form of the invention, the body is generally flat, and the skin is formed on one side of the body. On an opposite side of the body, an adhesive layer is applied. A protective adhesive release adheres to the adhesive surface.

In accordance with the preferred form of the invention, the small cavities have a diameter of up to about 70 microns. While no minimum size is necessary, in some instances, these small cavities may have a minimum diameter of about 20 microns. The small cavities are present in an average density of about 3 to 4 cavities per square millimeter.

The skin is about 10 microns thick. In order to protect the skin, it is overlain by a siliconized release which is removed during use.

BRIEF DESCRIPTION OF DRAWINGS

The invention is described in greater detail in the following description of examples embodying the best mode of the invention, taken in conjunction with the drawing figures, in which.

DESCRIPTION OF EXAMPLES EMBODYING THE BEST MODE OF THE INVENTION

Figure 1:
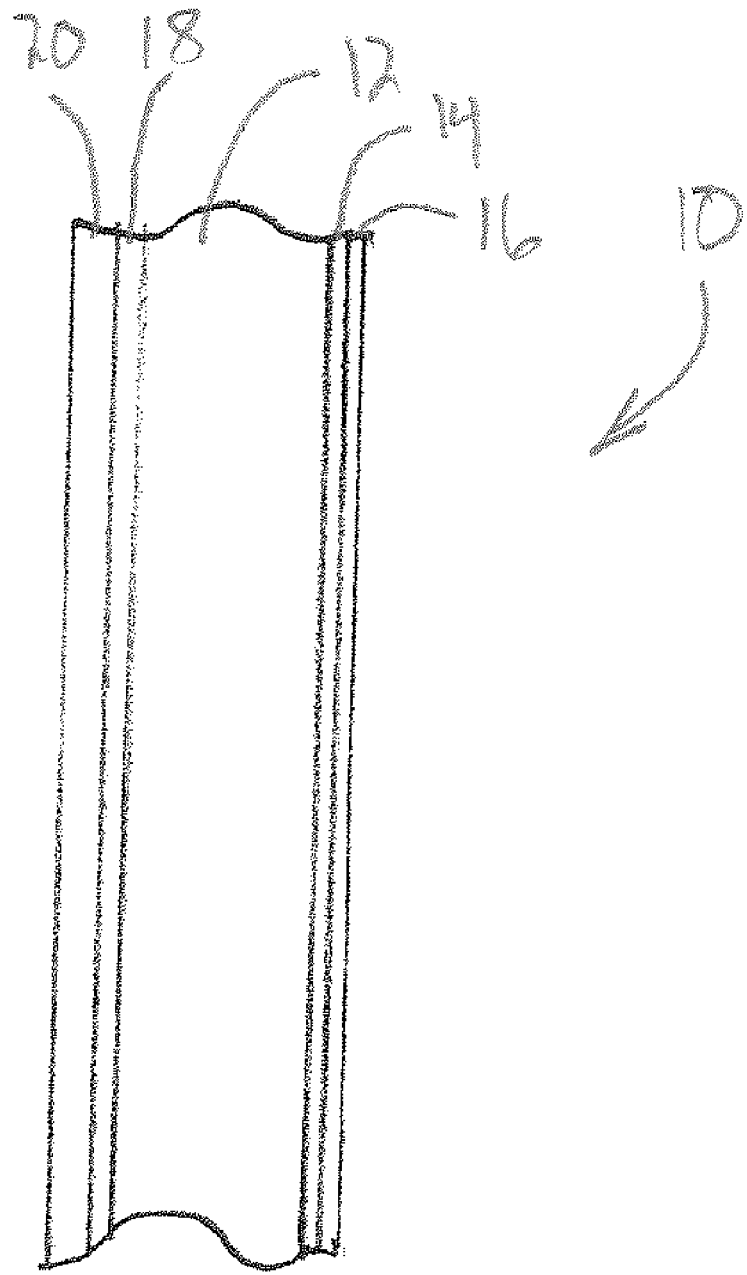
FIG. 1 is an enlarged, partial cross-sectional illustration of one form of the invention.
Figure 2:
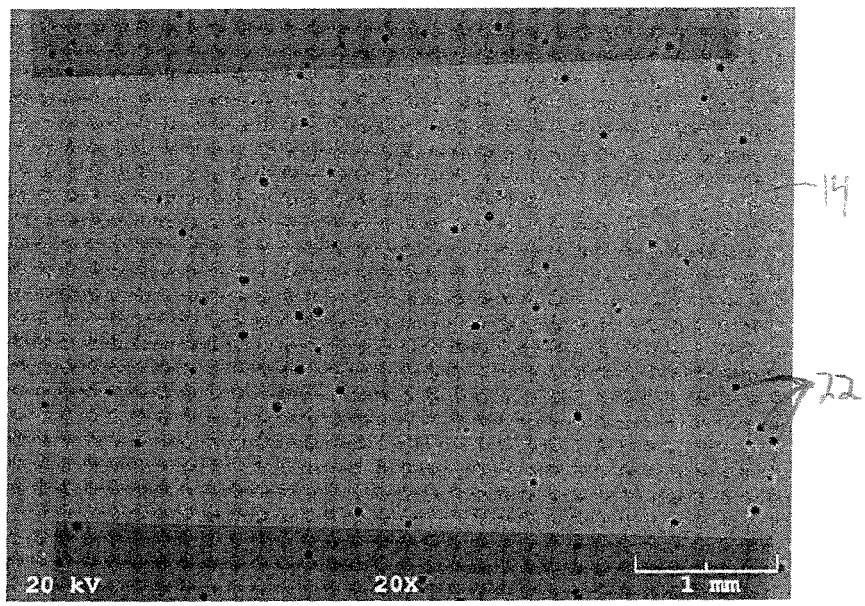
FIG. 2 is a photographic image of the skin of the material at a magnification of 20 times, showing surface imperfections not visible to the naked eye without magnification.
Figure 3:
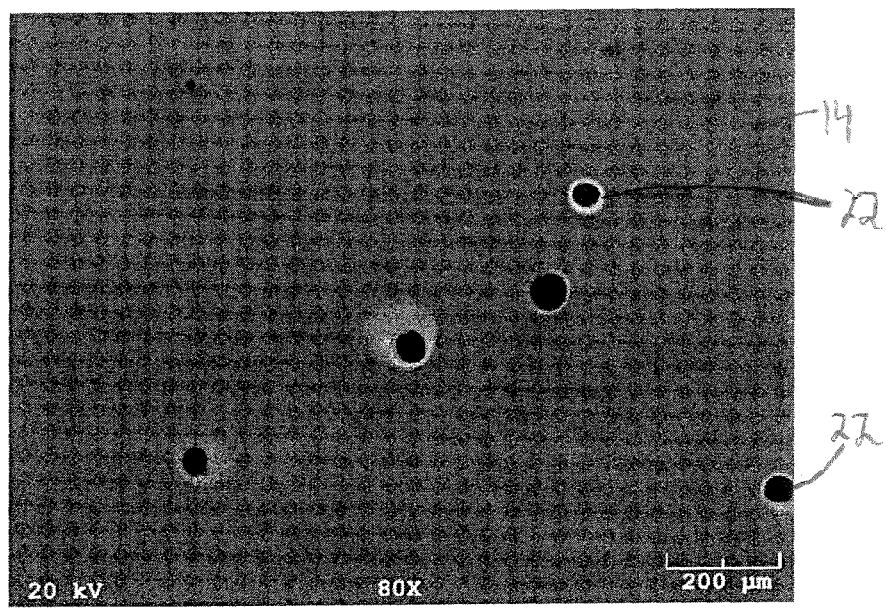
FIG. 3 is a photograph similar to FIG. 1 of the same surface, but with the magnification being 80 times.
Figure 4:
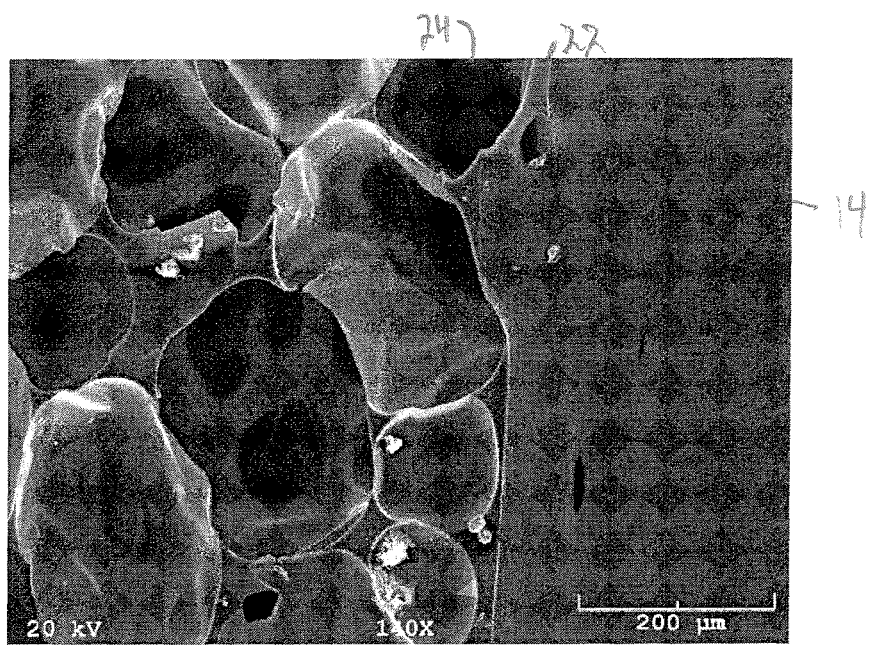
FIG. 4 is a photographic image of a cross section of the material at an interface, showing the skin on one side, with the cellular structure beneath, at a magnification of 140 times.
Figure 5:
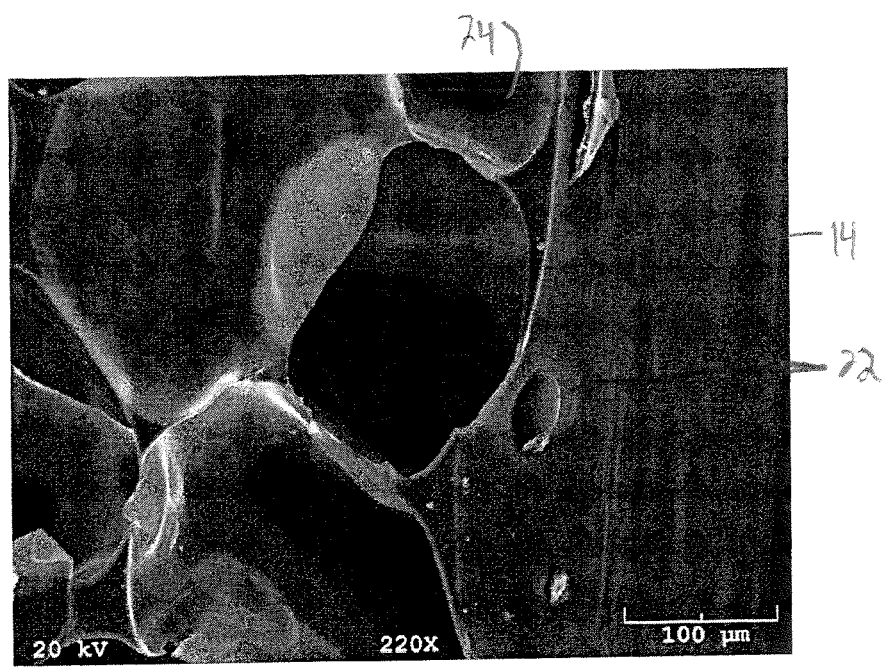
FIG. 5 is the same image as FIG. 4, but at a magnification of 220 times.
Figure 6:
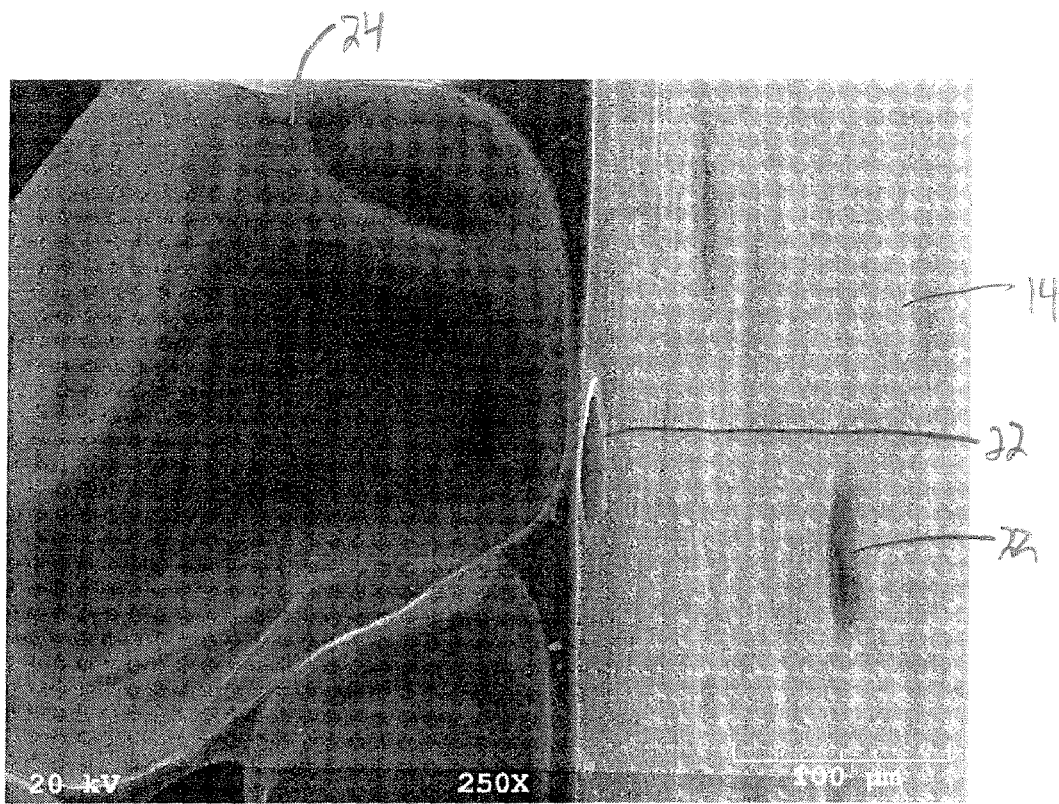
FIG. 6 is a further cross-sectional photographic image of the material, and with a magnification of 250 times.

A typical cross section of the material according the invention is shown generally at 10 in FIG. 1. The material 10 is composed of a body 12 of foamed polyvinyl chloride and a thin skin 14 integrally formed on one side of the body 12, as explained in greater detail below. A siliconized release 16 overlies the skin 14, and is removable therefrom. The opposite side of the body 12 from the skin 14 may include a replication of the skin 14, overlain by a removable siliconized release. However, it is preferred that the skin 14 be formed on only one side of the body 12, and on the side opposite to the skin 14 an adhesive layer 18 is located. The adhesive layer 18 may be any conventional adhesive, and is overlain by a protective adhesive release 20 which protects the adhesive layer 18 and is removable therefrom.

The body 12 is of any desired depth, and is formed by continuously calendaring a polyvinyl chloride liquid onto the siliconized release 16. The polyvinyl chloride is conventional, and includes a conventional blowing agent, such as phthalate. It may also include a tackifier. Once the polyvinyl chloride material is calendared onto the siliconized release 16, it is then appropriately heated, such as in an oven chamber, at an appropriate temperature, such as about 400° Fahrenheit in order to activate the blowing agent. About two minutes at 400° Fahrenheit is sufficient for activation.

Once the blowing agent is activated, the body 12 is formed, comprising about 80% closed cell foam, and up to about 20% open cell foam. The portion of the liquid polyvinyl chloride directly contacting the siliconized release 16, however, forms the thin skin 14 which has an impervious surface. Directly under the skin 14 is the cellular structure of the body 12. The nature of the skin 14 is described in greater detail below.

The adhesive layer 18 may be any conventional adhesive which is intended to adhere to whatever it is applied, once the adhesive release 20 is removed. Once the release 20 is removed and the adhesive layer 18 is adhered to whatever is to be supported (not illustrated), the siliconized release 16 can be removed from the skin 14, and the body 12 can then be removably adhered, via the skin 14, to a smooth, impervious surface, such as stainless steel, glass, or the like.

FIGS. 2 through 7 are photographic illustrations, substantially magnified, of the material 10 and in particular to the nature of the skin 14 and its characteristics. The photographs of FIGS. 2 through 6 were taken using scanning electron microscopy.

As illustrated in FIGS. 2 through 6, the skin 14 includes a series of surface imperfections comprising small cavities 22. The cavities 22 are fairly evenly distributed over the surface of the skin 14, with the number of cavities per unit area being about 3 to 4 cavities per square millimeter. The cavities have a diameter up to about 70 microns and while there is no minimum size, generally the cavities have a minimum diameter no smaller than about 20 microns. The skin 14, itself, is about 10 microns thick.

The cavities 22 break through the surface of the skin 14. That is, the cavities 22 extend through the skin 14, and typically connect with an adjacent foam cell 24. It is believed that each of the cavities 22 forms, in essence, a small suction cup. Once the material 10 is formed and the siliconized release 16 is removed, the skin 14 does not readily cling to a surface to which it is simply lain. However, once pressure is applied to the material 10, so long as the skin 14 is on an impervious surface, such as glass or stainless steel, it adheres to that surface. It is believed that the adherence is due to the partial vacuum in each of the cavities 22. With the cavities 22 appearing at an average density of 3 to 4 per square millimeter, the material 12 is sufficient to not only adhere to an impervious surface, but also to support the weight of items that are secured the adhesive layer 18. When the material 10 is firmly pressed against an impervious surface, a pressure differential occurs, firmly holding the material 10 in place. With close to 100% surface contact between the material 10 and the surface to which it is applied, the material 10 exhibits a weight bearing capability many times beyond the weight of the material 10, itself.

It is unknown whether other means of attraction also help the material 10 cling to an impervious surface. Van Der Waals forces, and even weak chemical bonds at the atomic level, may occur to enhance the cling between the material 10 and the impervious surface to which the material 10 is applied. It is believed, however, that the majority of the cling exhibited by the material 10 with the skin 14 on an impervious surface is due to the pressure differential described above.

Various changed may be made to the invention without departing from the spirit thereof or scope of the following claims.

What is claimed is:

1. A material for clinging to smooth, impervious surfaces, comprising
   a. a body of foamed polyvinyl chloride, said body having a foam cellular structure of about 80% closed cell foam and up to about 20% open cell foam,
   b. a flexible skin on at least one side of a body, said skin being unfoamed polyvinyl chloride, and said skin having surface imperfections comprising small cavities,
   c. said material bearing a load in addition to weight of said material when applied to an impervious surface.

2. The material according to claim 1, in which said body is generally flat, said skin being on one side of said body, and including an adhesive layer on a side of said body opposite said one side.

3. The material according to claim 2, including a protective adhesive release adhering to said adhesive surface.

4. The material according to claim 1, in which said small cavities have a diameter of up to about 70 microns.

5. The material according to claim 4, in which said small cavities have a minimum diameter of about 20 microns.

6. The material according to claim 1, in which said small cavities are present in an average density of 3-4 cavities/mm$^2$.

7. The material according to claim 1, in which at least some of said small cavities connect through said skin to a cell in said body.

8. The material according to claim 1, in which said skin is about 10 microns thick.

9. The material according to claim 1, including a siliconized release to said skin.

10. A mounting material, comprising
    a. a generally flat body of foamed polyvinyl chloride, said body having a foam cellular structure of about 80% closed cell foam and up to about 20% open cell foam,
    b. a flexible skin on one side of said body, said skin being unfoamed polyvinyl chloride, and having surface imperfections comprising small cavities,
    c. a siliconized release adhering to said one side,
    d. an adhesive surface on a second side of said body opposite said first side,
    e. a protective adhesive release adhering to said adhesive surface.

11. The mounting material according to claim 10, in which said small cavities have a diameter of up to about 70 microns.

12. The mounting material according to claim 11, in which said small cavities have a diameter of up to about 70 microns.

13. The mounting material according to claim 10, in which said small cavities have a minimum diameter of about 20 microns.

14. The material according to claim 10, in which at least some of said small cavities connect through said skin to a cell in said body.

15. The mounting material according to claim 10, in which said skin is about 10 microns thick.

* * * * *